Nov. 27, 1951 — O. G. MOSHER — 2,576,411
AUTOMATIC WEIGHING MACHINE
Filed May 12, 1947 — 6 Sheets-Sheet 1

INVENTOR
Oren G. Mosher
BY
Paul D. Flehr
ATTORNEY

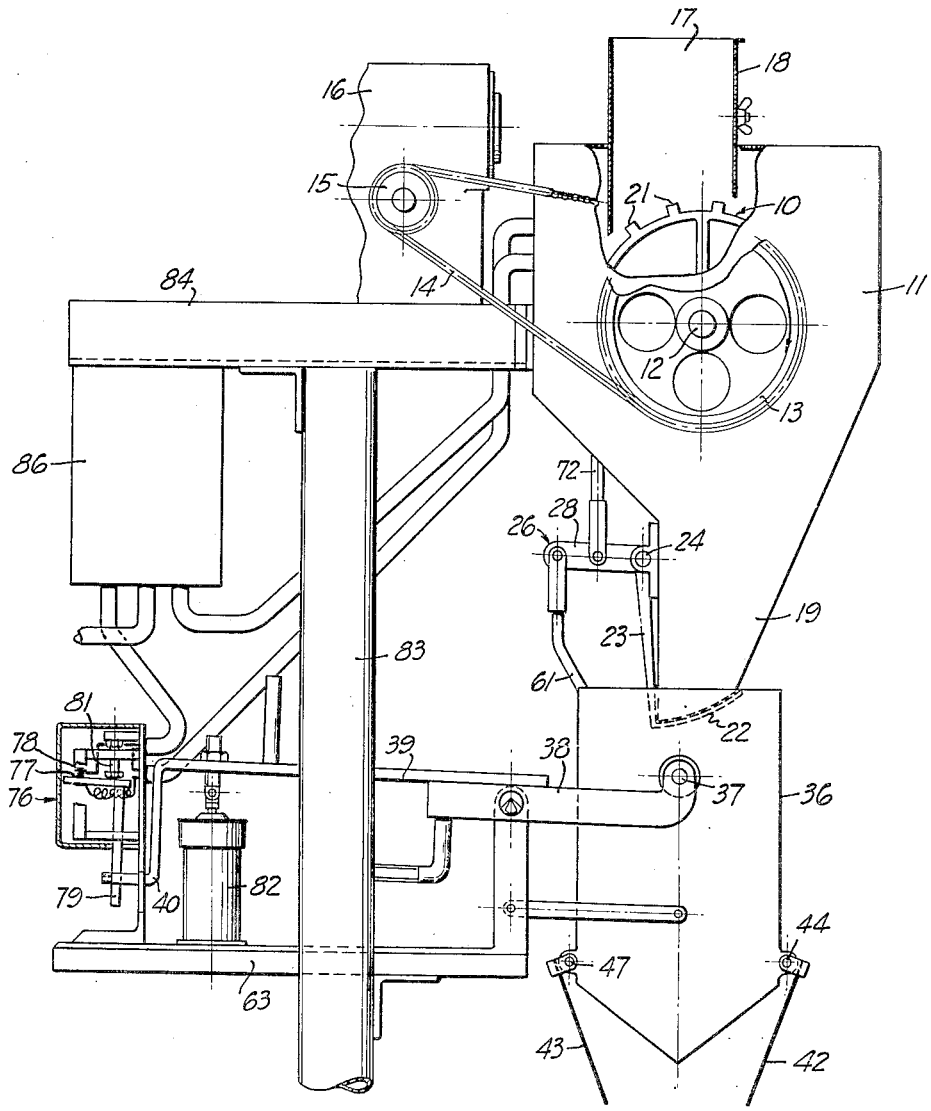

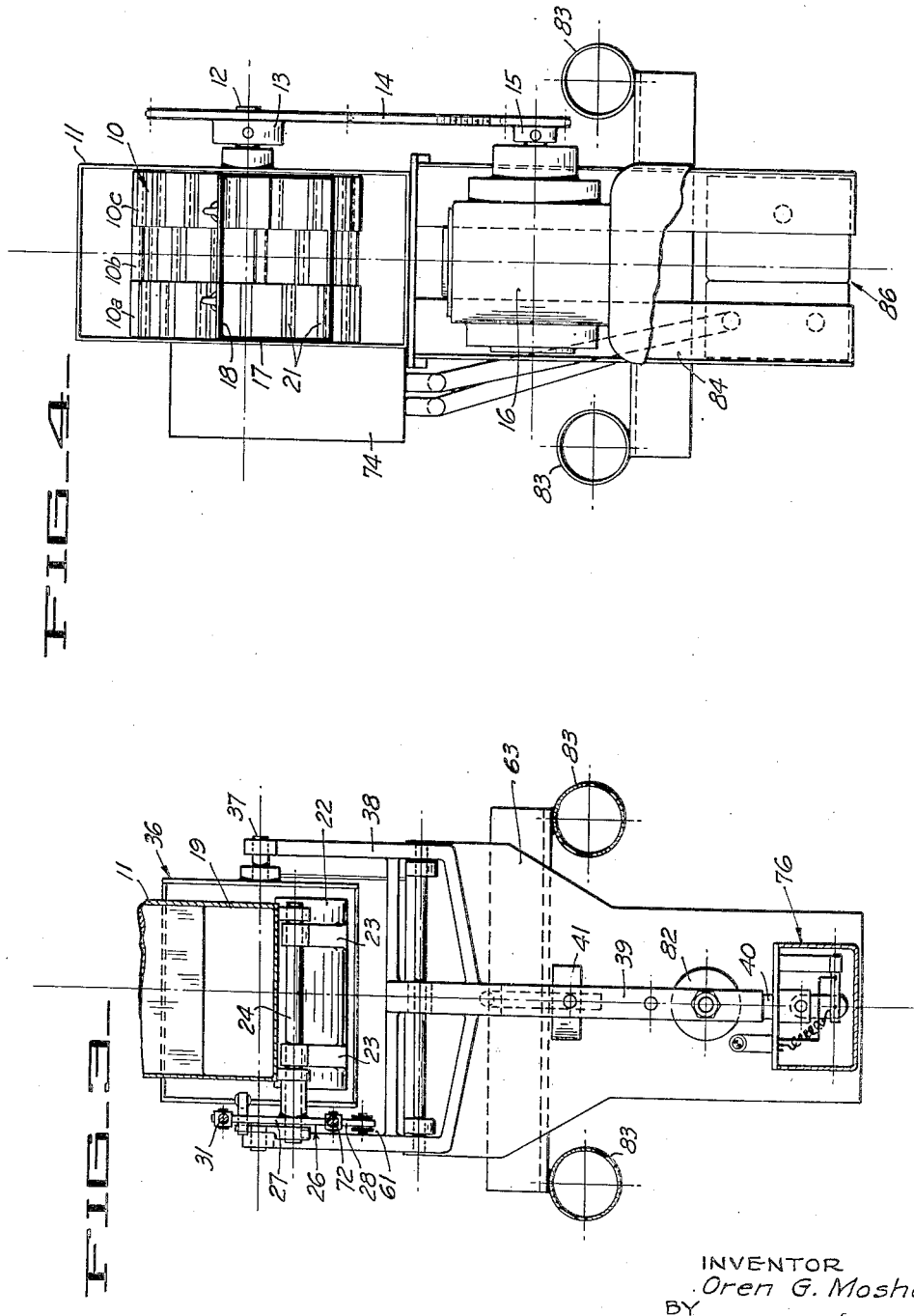

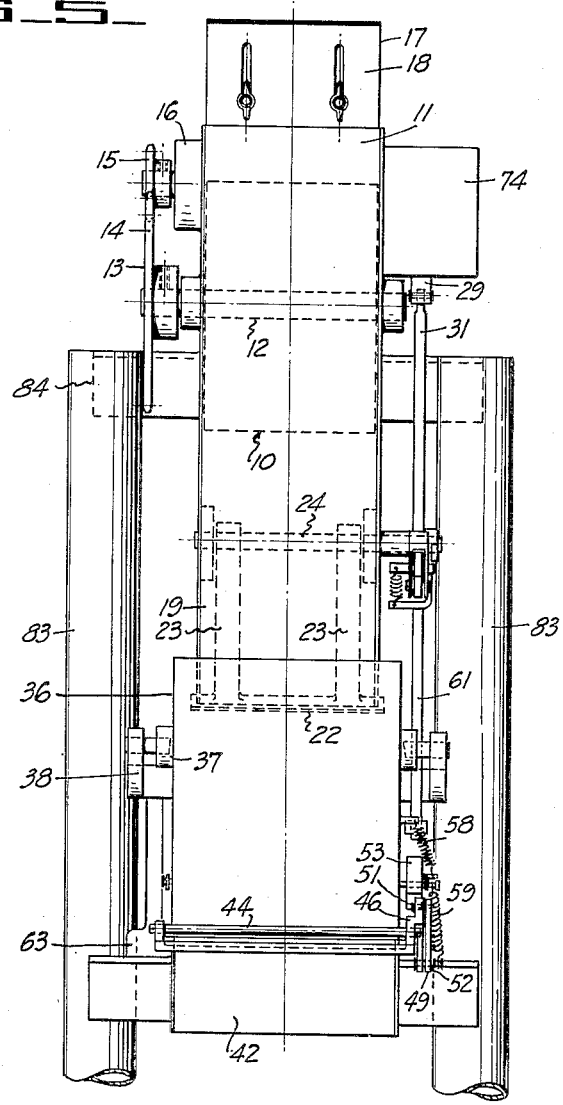

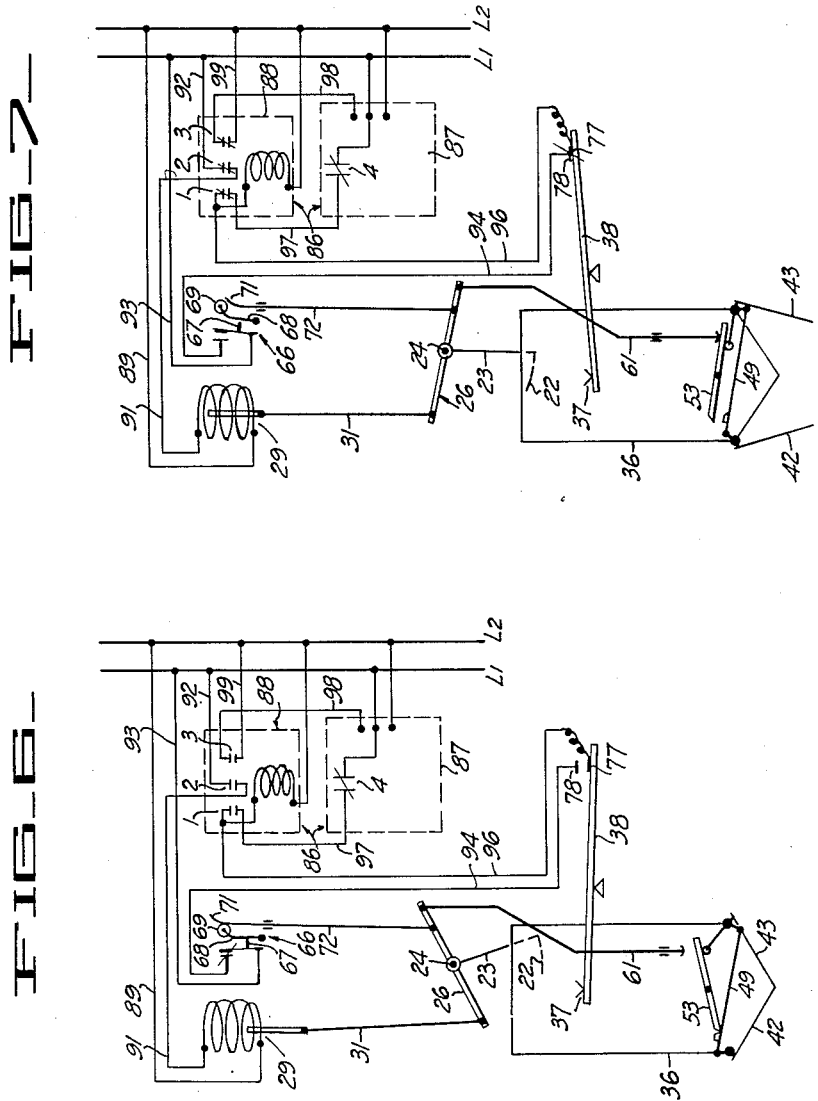

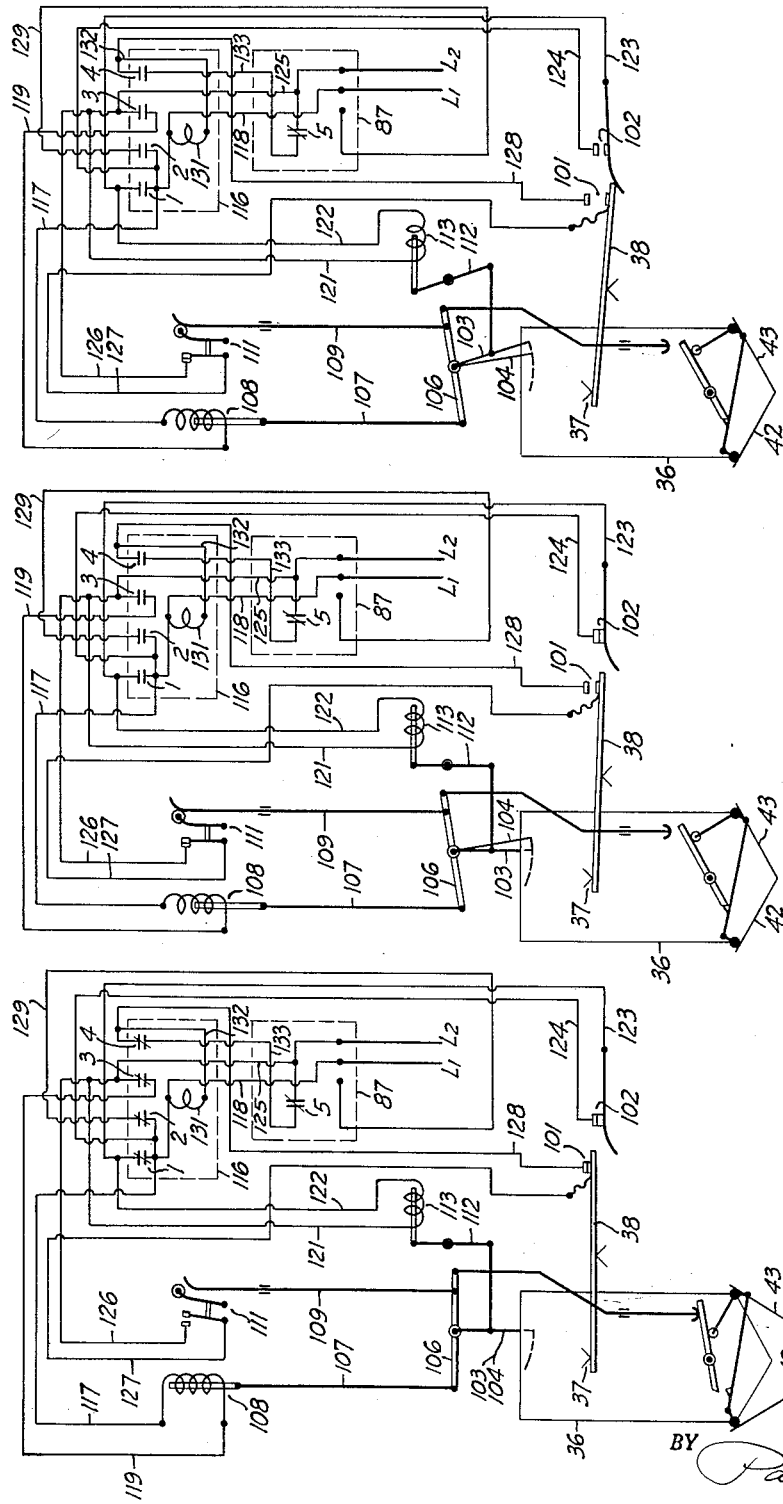

Patented Nov. 27, 1951

2,576,411

UNITED STATES PATENT OFFICE 2,576,411

AUTOMATIC WEIGHING MACHINE

Oren G. Mosher, Oakland, Calif., assignor to Eagle Machinery Co., Ltd., San Francisco, Calif., a corporation of Nevada Application May 12, 1947, Serial No. 747,513

5 Claims. (Cl. 249—53)

This invention relates generally to automatic equipment for weighing predetermined quantities of a bulk material. It can be successfully applied to a wide variety of products including particularly dried fruit like prunes or raisins which are to be weighed in predetermined quantities for packaging.

It is an object of the invention to provide a machine of the above character which is particularly well adapted for measuring out small quantities of various products, and which would afford a relatively high degree of accuracy together with a high weighing speed.

A further object of the invention is to provide a machine of the above character which is relatively simple in its construction and cycle of operation.

Another object of the invention is to provide a novel mechanism in conjunction with a weighing hopper for effecting automatic discharge of the product being weighed.

Additional objects of the invention will appear from the following description in which the preferred embodiment of the invention has been set forth in detail in conjunction with the accompanying drawing.

Referring to the drawing:

Figure 2 is a side elevational view looking toward the opposite side of the machine, with certain parts of the machine being in section, and other parts broken away.

Figure 3 is a cross sectional view of the machine taken along the line 3—3 of Figure 1.

Figure 4 is a top plan view of the machine.

Figure 5 is a front elevational view illustrating the machine.

Figures 6 and 7 illustrate the machine schematically, together with the electrical circuit diagram.

Figure 8 is a diagrammatic view illustrating another embodiment of the invention in which both precision and bulk gates are employed.

Figures 9 and 10 illustrate diagrammatically the same apparatus as Figure 8, but with the parts in different operating positions.

Figure 1:
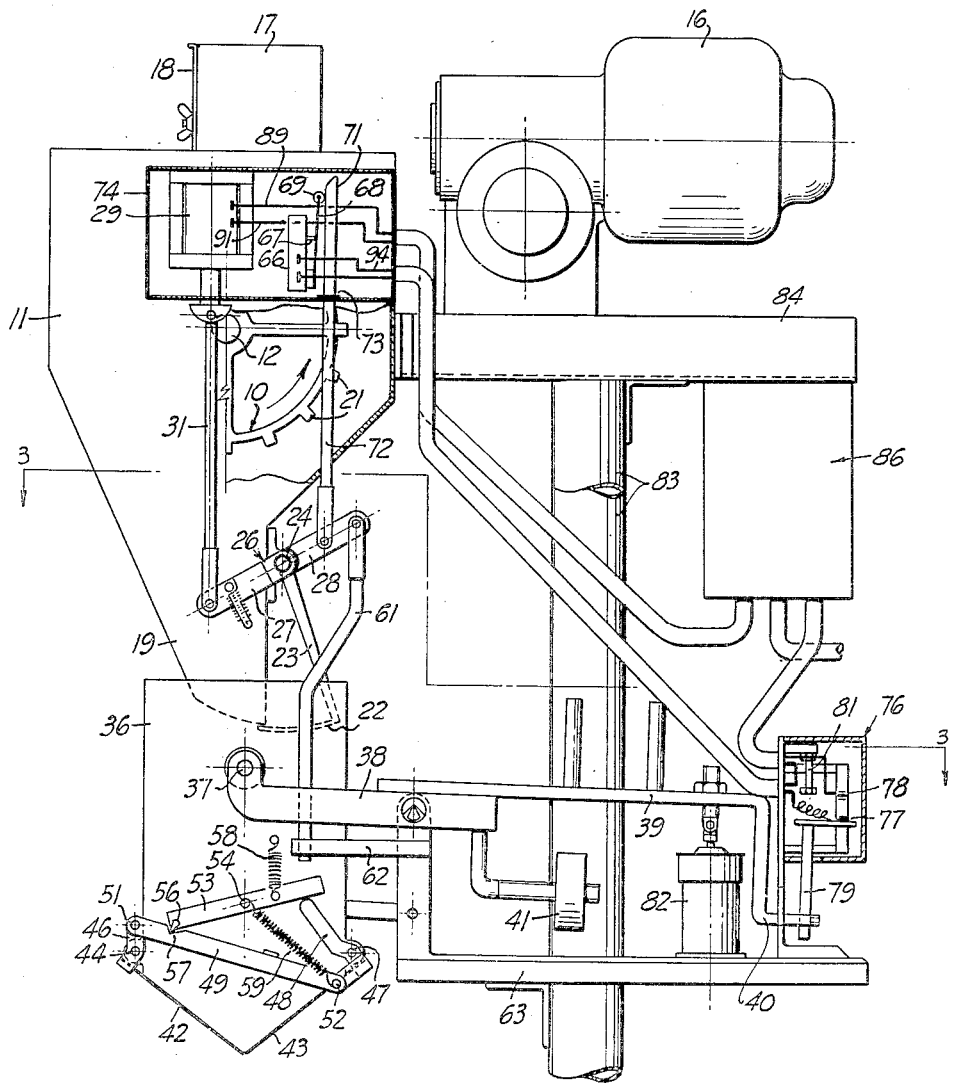
Figure 1 is a side elevational view of a machine incorporating the present invention, with certain parts being broken away, and certain parts being shown in cross section.

The present invention makes use of a continuously rotated feed drum which serves to feed products such as dried raisins at a constant rate. Below this feed drum there is a collecting or retention hopper adapted to accumulate the raisins for a temporary interval and which is provided with a closure gate. Below the retention hopper there is a weighing hopper carried by a weighing beam. The lower end of the weighing hopper is equipped with swinging doors which can be opened or closed, and which enable discharge of a weighed quantity of the product. When a weighed quantity of the product is being discharged from the weighing hopper, the gate of the collecting hopper is closed to enable accumulation of raisins being supplied by the feed drum. After a discharge operation from the weighing hopper, the gate is opened to permit the raisins to pass into the weighing hopper until a predetermined weight has been obtained. The parts just described are operated and cycled by means of an electrical circuit and electrical motive means, whereby when the discharge doors of the weighing hopper are tripped to open position, automatic cycling means returns the doors to closed position after a predetermined time interval, and simultaneously opens the gate from the retention hopper.

Referring first to Figures 1 and 2 of the drawing, the machine disclosed therein consists of a rotating feed drum 10 disposed within the upper portion of a housing 11. The horizontal shaft 12 upon which the drum 10 is mounted is extended and provided with an external sprocket 13, driven by chain 14 from a pinion sprocket 15 carried by an electric motor 16. The motor is operated continuously whereby the drum 10 is rotated at a predetermined speed. A chute 17 communicates through the top of the housing 11 and is provided with a manually adjustable gate 18, whereby the spacing of the lower edge of this gate and the periphery of the feed drum can be adjusted to adjust the rate with which the product, such as raisins, is supplied by the drum to the lower portion 19 of the housing 11.

The construction of the feed drum 10 may vary depending upon the product being handled. In the form illustrated the drum is made in three sections 10a, 10b and 10c, the peripheries of which are provided with spaced cleats 21.

The lower portion 19 of the housing 11 forms a retention hopper which is provided with a gate 22 carried by the arms 23. These arms are pivoted at 24 whereby the gate can be swung between open and closed positions. Closed position is illustrated in Figure 2 and open position in Figure 1. A lever 26 is attached to the shaft forming the pivotal connection 24, and this lever consists of two oppositely extending arms 27 and 28.

An electrical solenoid 29 is mounted upon one side of the housing 11 (Figure 1) and has its operating member attached by rod 31 to the arm 27. Thus when solenoid 29 is energized rod 31 is pulled upwardly to swing the gate 22 to closed position.

Disposed below the retention hopper 19 there is a weighing hopper 36. A fulcrum connection 37 forms an attachment between this weighing hopper and the arm 38 of a weighing beam 39. The arm 40 of this beam is associated with electrical contact means as will be presently described. The beam is shown provided with an adjustable counter balancing weight 41.

The lower opened end of the weighing hopper 36 is contoured V-shaped as illustrated in Figure 1, and is normally closed by a pair of doors 42 and 43. The door 42 is pivoted at 44 to the hopper and is provided with the operating arm 46. Door 43 likewise has a pivotal connection 47 with the weighing hopper, and has an operating arm 48. Link 49 serves to connect the two doors, and has one end attached by pivotal connection 51 with arm 46, and its other end pivotally attached at 52 to the door 43. Thus the two doors 42 and 43 must open and close in synchronism.

A latch lever 53 has a pivotal mounting 54 on one side of the weighing hopper. One end of this lever has a knife edge 56 which engages in the notch 57, formed in the link 49. The other portion of the latch lever is normally urged upwardly by tension spring 58, and is adapted to engage the upper end of the operating arm 48. Tension spring 59 serves to normally urge both the doors 42 and 43 toward closed position.

A push rod 61 has its upper end pivotally attached to the arm 28, and its lower end slidably guided in a bar 62 which is carried by the frame 63 of the machine. When rod 61 is moved downwardly, which occurs upon energizing the solenoid 29, its lower end applies thrust to the lever 53 to rotate the latter in a clockwise direction, whereby the knife edge 56 is displaced from the notch 57, after which further movement of the lever 53 turns arm 48 in a counter clockwise direction to move both the doors 42 and 43 to full open position. When push rod 61 is again returned to its initial position, the doors 42 and 43 return to closed position and the latch 53 automatically reengages with the notch 57.

As a part of the electrical means employed a small switch 66, such as one of the "microswitch" type, is mounted upon the side of the housing 11, and its operating member 67 is adapted to engage a movable lever 68. A roller 69 carried by the free end of this lever is adapted to engage a cam surface 71 formed upon the upper end of the rod 72. This rod is slidably retained by guide means 73 mounted in housing 74, and has its lower end pivotally attached to arm 28. The construction of switch 66 is such that for the position of the parts illustrated in Figure 1 the contacts of this switch are closed, whereas when rod 72 is moved downwardly upon closing of gate 22, the contacts of this switch are opened.

As previously mentioned the weighing beam is associated with electrical contact means. Thus contacting device 76 is mounted upon the rear of the machine, and is provided with movable and stationary electrical contacts 77 and 78. The movable contact 77 is carried upon a vertically movable member 79, which has an operating connection with the rear end of the beam arm 40. Member 79 is also adapted to engage in adjustable stop 81. Thus when a predetermined weight has been placed in the weighing hopper 36, the balancing of the weighing beam causes contacts 77 and 78 to be brought into engagement. It is desirable that movement of the weighing beam be damped by suitable means such as a dash pot 82, in order to prevent undesirable swinging of the beam or chattering of the contact.

It will be evident that the parts just described can be mounted in any suitable manner upon supporting or frame means. In the contruction illustrated the beam supporting frame 63 is carried by the vertical standards 83. A platform 84 is carried by the upper ends of standards 83, and serves to form a mounting for the housing 11 and electric motor 16. Also this platform serves to mount an assembly 86 which includes a relay and a time delay means of the vacuum tube type.

The electrical connections for the various parts can be best understood by reference to Figures 6 and 7. In addition to the switch 66 and the contacts 77 and 78, I provide a time delay device 87 and a relay 88. The relay 88 is provided with three sets of contacts 1, 2 and 3. The time delay device 87 also incorporates normally closed relay contacts 4. It is desirable that this time delay relay be of the vacuum tube type, such as the time delay relay manufactured by General Electric Company of Schenectady, New York, under No. C. R. 7504–A3D. Such a device utilizes a triode, the grid potential of which is controlled by the charging and discharging of the condenser. Plate current operates the windings of a relay which is provided with the contact 4.

The circuit diagram as illustrated includes the current supply lines L–1 and L–2, which may be standard 110 v., 60 cycle A. C. Conductor 89 connects supply line L–2 with one side of the solenoid 29. The other side of this solenoid is connected by conductor 91 with one of the contacts 2. The other one of the contacts 2 is connected by conductor 92 to line L–1. Line L–1 is conducted by conductor 93 to one side of the switch 66. The other side of this switch is connected by conductor 94 with the contact 78. Movable contact 77 is connected by conductor 96 with one of the contacts 1. The other one of contacts 1 connects by line 97 to the relay contacts 4 of the time delay device 87. The time delay device 87 also has one of its terminals connected by conductor 98 to one of the contacts 3. The other one of contacts 3 is connected by conductor 99 with the line L–2. The winding of relay 87 has its one terminal connected to conductor 96, and its other terminal connected to line L–2.

Operation of my weighing machine can now be reviewed as follows: As previously stated the feed drum 10 is operated at a predetermined constant speed of rotation, and a sufficient feed rate is established to the housing 11 to accommodate the weighing speed of the machine. Assuming that raisins are to be handled by the machine, raisins can be supplied to the chute 17 at a proper average rate by suitable means such as a belt conveyor, shaker conveyor, or the like. Starting with the gate 22 open, and the doors 42 and 43 closed, the raisins fed by the drum 10 drop down through the hopper 19 into the weighing hopper 36 and there accumulate until the weight is sufficient to cause balancing of the weighing beam. When the desired weight has been supplied to the hopper 36 contacts 77 and 78 are closed and a circuit is established for energizing the winding of relay 88 which can be traced from line L-1, conductor 93, switch 66, contacts 77 and 78, conductor 96, and the winding of relay 88 back to the line L-2. Thus the contacts 1, 2 and 3 of this relay are all closed, and also the time delay device 87 starts its cycle and closes its contacts 4. Contacts 1 establish a holding circuit for the winding of relay 87 whereby this relay is held closed irrespective of chattering of contacts 77 and 78. The closing of contacts 2 causes the solenoid 29 to be energized by way of an energizing circuit which can be traced from line L-2, conductor 89, the winding of solenoid 29, conductor 91, contacts 2 and conductor 92 back to line L-1. When solenoid 29 is energized gate 22 is first closed, and thereafter continued downward movement of the push rod 61 actuates the latch lever 53 and effects rapid opening of the doors 42 and 43. Opening of the doors 42 and 43 discharges the weighed material from the hopper 36. Also upon energizing solenoid 29 normally closed switch 66 is opened thereby opening the circuit which includes contacts 77 and 78. Thus the weighing beam may return to its normal position before commencement of another operating cycle. Immediately upon initial closing of contacts 77 and 78 the time delay means 87 starts its time cycle, and within a predetermined time interval contacts 4 are automatically opened. This serves to deenergize the winding of relay 88, whereby the opening of the contacts of this relay simultaneously causes deenergization of solenoid 29. Thus doors 42 and 43 are returned to closed position and immediately thereafter gate 22 is moved to open position. During the time interval that gate 22 is closed, the drum 10 continues to feed raisins into the hopper 19, where they accumulate until the gate 22 opens.

It will be evident from the foregoing that I have provided an automatic machine capable of weighing out relatively small amounts of material such as dried raisins, at a relatively high rate of speed and with comparatively high accuracy. When used in a packing establishment the weighing hopper 36 can be arranged to discharge its contents directly into a sack or carton to be filled.

In the embodiment of Figures 8 to 10 inclusive, both bulk and precision gates are utilized to control discharge of raisins from the hopper 19, in place of a single gate as in Figures 1 to 7 inclusive. The operating means for the two gates is such that they are operated in sequence, whereby both gates remain open until the bulk of the raisins has been introduced into the weighing hopper 36, at which time the larger gate is closed. The smaller precision gate remains open until the final weight has been obtained.

The weighing hopper 36, the doors 42 and 43, and the latch mechanisms associated with the doors, are substantially the same as the first described modification. In addition to the contacts 101 corresponding to the contacts 77 and 78, the beam is associated with a second set of contacts 102. The two sets of contacts are adjusted in such a fashion that as the beam approaches balance position, contacts 102 are first closed, and then subsequently as a final weight is reached, contacts 101 are closed. Hopper 19 is provided with two swinging gates 103 and 104 which are arranged side by side. Gate 103 is relatively wide and can be termed the bulk gate, while gate 104 is relatively narrow and can be termed the precison gate. Gate 104 is connected to the operating lever 106, which in turn is connected by rod 107 to the solenoid 108. Lever 106 also connects with rod 109, which serves to operate the switch 111.

Gate 103 is connected by a lever in linkage mechanism 112 with the operating member of a second solenoid 113. Time delay device 87 is the same as the device for Figures 6 and 7, but the relay 116 is provided with four sets of contacts 1, 2, 3 and 4, in place of three sets of contacts as in Figures 6 and 7.

With respect to the circuit connections of Figures 8 and 10 conductor 117 connects one terminal of solenoid 108 with the lower ones of the contacts 1 and 2, and with the extended conductor 118 which leads to the line L-1. The other terminal of the solenoid 108 is connected by conductor 119 with the lower one of contacts 3. Conductor 121 connects one terminal of solenoid 113 with the upper one of contacts 3, and conductor 122 connects the other terminal of solenoid 113 with the upper one of contacts 1, and also with the extended conductor 123 which leads to one side of the switch 102. The other side of switch 102 is connected by conductor 124 with the lower of the two contacts 1 and 2. Conductor 126 connects one side of switch 111 with the upper one of the contacts 3 and also (by extension 125) with one of the contacts 5 and line L-2, and the other side of switch 111 is connected by conductor 127 with one of the contacts 101. The other one of the contacts 101 is connected by conductor 128 with the upper one of the contacts 4. Conductor 129 leading from the time delay device 87 connects with the upper one of contacts 2. Line 118 leading from line L-1 and from the delay device, also connects to one side of the winding 131 of relay 116. The other side of winding 131 is connected by conductor 132 to the upper one of the contacts 4. The lower one of the contacts 4 is connected by conductor 133 to the time delay contacts 5.

Operation of the embodiment described with reference to Figures 8 to 10 inclusive is as follows: Figure 8 illustrates both the gates 103 and 104 in open position, at which time the feed means is supplying raisins to the weighing hopper 36. When the bulk of the weight has been delivered to the hopper 36, the weighing beam 38 swings sufficiently far to close contacts 102. This serves to close the energizing circuit for the solenoid 113, with the result that the bulk or larger one of the two gates, 103, is closed. Raisins continue to be delivered to the weighing hopper 36, but at a greatly reduced rate. When the desired weight has been obtained the balancing of beam 38 causes closing of contacts 101, and this starts device 87 on its time delay cycle, the winding of relay 116 is energized to close contacts 1—4, and solenoid 108 is energized. Energizing of solenoid 108 causes closing of the precision gate 104, and immediately thereafter the gates 42 and 43 are opened to discharge the weighed out material. Simultaneously with operation of solenoid 108 the switch 111 is operated to open its contacts, thus opening the circuit which includes the contacts 101. Closing of relay 116 establishes holding circuits which maintain solenoids 108 and 113 energized until the end of the time delay period, at which time contacts 5 open, to deenergize the winding of relay 116 and to open all of the contacts of the same.

Figure 9 illustrates the position of the parts upon closing of contacts 102 and closing of the bulk gate 103. Figure 10 illustrates both the bulk and the precision gates closed upon closing of both contacts 102 and 101, and the doors 42 and 43 are shown open to discharge material from the weighing hopper 36.

I claim:

1. In an automatic weighing machine, a feed means including a continuously rotating drum adapted to supply a product at a predetermined rate, a hopper adapted to receive the product from the feed means and having a lower open end, a gate adapted to close the lower end of the hopper, a weighing hopper disposed below the first named hopper, a weighing means serving to support the weighing hopper, an electrical motive device mounted independently of the weighing hopper, mechanical connecting means between the motive device and said gate to close and open the gate responsive to energization and deenergization of the motive means, a pair of swinging doors pivotally secured to the weighing hopper and adapted to close the lower end of the latter, means serving to connect said doors for conjoint movement between open and closed positions, spring means normally urging said doors toward closed position, a pivoted latch lever carried by the hopper and adapted to have latching engagement with said last named means to latch said doors in closed position to support material in the hopper, said latch lever when moved to unlatching position by downward force applied to the same serving to apply force to said doors to move the same to open position, and means forming a mechanical connection between said motive device and said latch lever to apply downward force to the same to move the lever to unlatching position and to effect opening of said doors, said means serving to effect opening of said doors immediately subsequent to closure of said gate, and electrical circuit means controlled by said beam for effecting automatic energization and deenergization of said motive device.

2. An automatic weighing machine as in claim 1 in which said circuit means includes a time delay means whereby said motive device is automatically deenergized a predetermined time interval after initial energization of the same.

3. In an automatic weighing machine, a feed means adapted to supply a product at a predetermined rate, a hopper disposed below the feed means and having a lower open end, a gate adapted to close the lower end of the hopper, a weighing hopper disposed below the first named hopper and adapted to receive products from the same when said gate is opened, doors serving to close the lower end of the weighing hopper, a weighing means serving to support the weighing hopper for vertical balancing movement, a single motive means mounted independently of the weighing hopper, a connection between said motive means and said gate to move the latter between open and closed positions, means connecting said doors for conjoint movement between open and closed positions, spring means for urging said doors toward closed position, latch means carried by the weighing hopper for retaining said doors closed and adapted to be tripped by force applied to the same to permit opening of the doors, and mechanism serving to connect said motive means to said latch means to trip the latter in response to actuation of said motive means, energization of said motive means serving to first close said gate and immediately thereafter trip said latch to effect opening of said doors, deenergization of said motive means serving to first effect closure of said doors and immediately thereafter opening of said gate, and electrical circuit means for effecting energization and deenergization of said motive means and adapted to be controlled by movement of said weighing beam.

4. An automatic weighing machine as in claim 3 in which said electrical circuit means includes time delay means adapted to interpose a predetermined time interval between initial energization of said motive means and deenergization of the same.

5. In an automatic weighing machine, a feed means adapted to supply a product at a predetermined rate, a hopper adapted to receive the product from the feed means and having a lower open end, a gate adapted to close the lower end of the hopper, a weighing hopper disposed below the first named hopper, a weighing means serving to support the weighing hopper, an electrical motive device mounted independently of the weighing hopper, mechanical connecting means between the motive device and said gate to close and open the gate responsive to energization and deenergization of the motive means, a pair of swinging doors pivotally secured to the weighing hopper and adapted to close the lower end of the latter, means serving to connect said doors for conjoint movement between open and closed positions, springs means normally urging said doors toward closed position, a pivoted latch lever carried by the hopper and adapted to have latching engagement with said last named means to latch said doors in closed position to support material in the hopper, said latch lever when moved to unlatching position by force applied to the same serving to apply force to said doors to move the same to open position, and means forming a mechanical connection between said motive device and said latch lever to apply force to the same to move the lever to unlatching position and to effect opening of said doors, said means serving to effect opening of said doors immediately subsequent to closure of said gate, and electrical circuit means controlled by said beam for effecting automatic energization and deenergization of said motive means.

OREN G. MOSHER.

REFERENCES CITED

The following references are of record in the file of this patent:

UNITED STATES PATENTS

| Number | Name | Date |
|---|---|---|
| 748,055 | Driver et al. | Dec. 29, 1903 |
| 1,846,148 | Rumpf | Feb. 23, 1932 |
| 2,097,522 | Hanique | Nov. 2, 1937 |
| 2,100,874 | Ryan et al. | Nov. 30, 1937 |
| 2,406,934 | Williams et al. | Sept. 3, 1946 |